(12) United States Patent
Peng

(10) Patent No.: US 11,290,554 B2
(45) Date of Patent: Mar. 29, 2022

(54) INFORMATION PUSHING METHOD AND APPARATUS

(71) Applicant: Tencent Technology (Shenzhen) Company Limited, Shenzhen (CN)

(72) Inventor: Yuanquan Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 328 days.

(21) Appl. No.: 15/957,753

(22) Filed: Apr. 19, 2018

(65) Prior Publication Data

US 2018/0241832 A1   Aug. 23, 2018

Related U.S. Application Data

(63) Continuation-in-part of application No. PCT/CN2016/111733, filed on Dec. 23, 2016.

(30) Foreign Application Priority Data

Jan. 21, 2016   (CN) .......................... 201610038929.2

(51) Int. Cl.
*H04L 67/50* (2022.01)
*H04L 67/55* (2022.01)
(Continued)

(52) U.S. Cl.
CPC ............. *H04L 67/26* (2013.01); *H04W 48/16* (2013.01); *H04W 84/12* (2013.01)

(58) Field of Classification Search
CPC ......... H04L 41/12; H04L 67/18; H04L 67/22; G06F 16/00
(Continued)

(56) References Cited

U.S. PATENT DOCUMENTS

2010/0317371 A1* 12/2010 Westerinen ....... H04M 1/72572
455/456.6
2011/0013569 A1*  1/2011 Scherzer ............... H04W 88/06
370/329

(Continued)

FOREIGN PATENT DOCUMENTS

CN      102843745 A    12/2012
CN      103281755 A     9/2013
(Continued)

OTHER PUBLICATIONS

Tencent Technology, ISR, PCT/CN2016/111733, Mar. 8, 2017, 2 pgs.

(Continued)

*Primary Examiner* — Suraj M Joshi
*Assistant Examiner* — Sherman Lin
(74) *Attorney, Agent, or Firm* — Morgan, Lewis & Bockius LLP

(57) ABSTRACT

A server obtains at least two target base attributes of a target wireless network. The target wireless network is connected to a target terminal. After determining, according to a preset condition-based classification processing procedure, that the at least two target base attributes satisfy a target condition combination, the server obtains a network provider attribute corresponding to the target condition combination and determines a respective network provider attribute corresponding to the target condition combination as a target attribute of a provider providing the target wireless network. Finally, the server pushes target information associated with the target attribute to the target terminal.

20 Claims, 8 Drawing Sheets

(51) Int. Cl.
*H04W 48/16* (2009.01)
*H04W 84/12* (2009.01)

(58) Field of Classification Search
USPC .................................................. 709/224, 204
See application file for complete search history.

(56) References Cited

U.S. PATENT DOCUMENTS

2012/0239500 A1* 9/2012 Monahan .............. G01S 5/0036
705/14.58
2015/0358406 A1 12/2015 Scheer et al.

FOREIGN PATENT DOCUMENTS

| CN | 103945007 A | 7/2014 |
| CN | 103987012 A | 8/2014 |
| CN | 105263110 A | 1/2016 |

OTHER PUBLICATIONS

Tencent Technology, Written Opinion, PCT/CN2016/111733, dated Mar. 8, 2017, 5 pgs.
Tencent Technology, IPRP, PCT/CN2016/111733, Jul. 24, 2018, 6 pgs.

* cited by examiner

| SSID | BSSID | Result of word segmentation of the SSID | Industry |
|---|---|---|---|
| CMCC-EDU | 38:22:d6:86:94:12 | cmcc, edu | Cultural education |
| TANGLA Hotel | 38:22:d6:86:9d:11 | TANGLA, Hotel | Hotel |
| Tao Heung Group | 44:e4:d9:01:e8:0f | Tao Heung, Group | Company |
| ... | ... | ... | ... |

FIG. 4

| Line number | Level-1 classification | Level-2 classification | Term frequency |
|---|---|---|---|
| 1 | Organization | | and-business |
| 2 | Cultural education | Education school | cmcc-edu |
| 3 | Hotel | | hotel |
| 4 | Company | Enterprise/factory | office |
| 5 | Hotel | | Hotel |
| 6 | Cultural education | Education school | student |
| 7 | Cultural education | Education school | eduroam |
| 8 | Entertainment | KTV | ktv |
| 9 | Public facilities | | ollehwifi |
| 10 | Hotel | | Hotel |
| 11 | Hotel | | daysinn |
| 12 | Hotel | Star hotel | huazhu |
| 13 | Cultural education | Education school | teacher |
| 14 | Organization | | cctv |
| 15 | Transportation hub | Bus station | 9797168.com |

FIG. 5

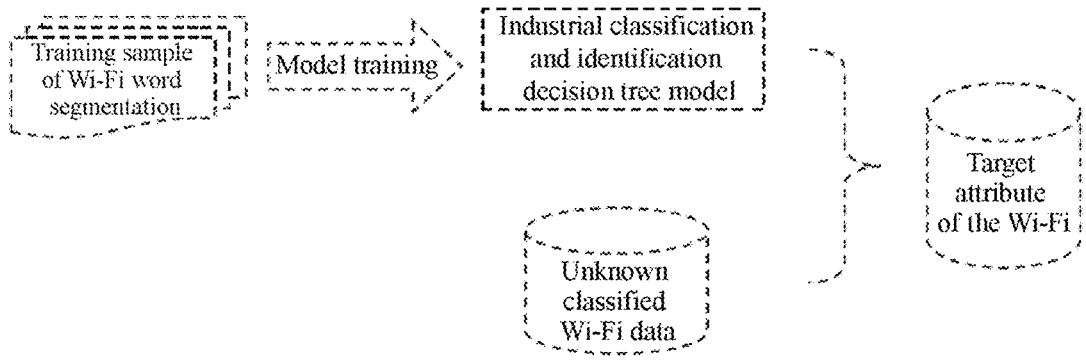

FIG. 6

| max_ap_num | History maximum quantity of connected equipment |
| --- | --- |
| imei_cnt_all | History quantity of manager users |
| conn_days | Connection days |
| imei_cnt21 | Quantity of users powering off machines in last 21 days |
| add_label1 | Level-1 classification of geographic location |
| add_label2 | Level-2 classification of geographic location |
| is_dbscan | Having a community attribute or not |
| is_priv | Private Wi-Fi or not |
| vendor | Manufacturer |
| safe_type | Encryption type |
| change_rate | User change rate |
| c_0_7 | Quantity of users from 0 o'clock to 7 o'clock |
| c_7_12 | Quantity of users from 7 o'clock to 12 o'clock |
| c_12_14 | Quantity of users from 12 o'clock to 14 o'clock |
| c_14_19 | Quantity of users from 14 o'clock to 19 o'clock |
| c_19_22 | Quantity of users from 19 o'clock to 22 o'clock |
| c_22_24 | Quantity of users from 22 o'clock to 24 o'clock |
| Type | Commercial attribute determined through word segmentation of an SSID |

FIG. 7

| Predicted \\ Actual | Catering | Public facilities | Company | Shopping mall | Organization | Transportation hub | Hotel | Tourism attraction | Community and residence | Life service | Cultural education | Entertainment | Medical care |
|---|---|---|---|---|---|---|---|---|---|---|---|---|---|
| Catering | 627 | 31 | 22 | 86 | 15 | 95 | 27 | 58 | 201 | 190 | 3 | 241 | 125 |
| Public facilities | 18 | 610 | 18 | 60 | 2 | 24 | 41 | 23 | 14 | 45 | 45 | 48 | 79 |
| Company | 10 | 37 | 465 | 73 | 19 | 53 | 53 | 13 | 25 | 12 | 41 | 28 | 48 |
| Shopping mall | 24 | 31 | 122 | 1059 | 63 | 50 | 117 | 129 | 60 | 64 | 31 | 67 | 56 |
| Organization | 37 | 31 | 7 | 28 | 2653 | 154 | 8 | 46 | 1 | 33 | 15 | 81 | 88 |
| Transportation hub | 94 | 103 | 53 | 121 | 25 | 1441 | 90 | 91 | 142 | 95 | 20 | 77 | 108 |
| Hotel | 11 | 11 | 46 | 67 | 1 | 11 | 294 | 19 | 84 | 17 | 7 | 51 | 70 |
| Tourism attraction | 15 | 70 | 25 | 103 | 40 | 140 | 125 | 1697 | 34 | 34 | 69 | 54 | 93 |
| Community and residence | 242 | 109 | 123 | 192 | 0 | 324 | 209 | 132 | 1497 | 245 | 21 | 360 | 131 |
| Life service | 131 | 33 | 20 | 22 | 23 | 35 | 11 | 34 | 66 | 374 | 55 | 154 | 70 |
| Cultural education | 8 | 183 | 87 | 28 | 65 | 92 | 79 | 66 | 3 | 56 | 1815 | 13 | 83 |
| Entertainment | 522 | 82 | 59 | 103 | 35 | 92 | 128 | 27 | 244 | 323 | 9 | 989 | 507 |
| Medical care | 84 | 149 | 69 | 76 | 16 | 89 | 91 | 170 | 89 | 125 | 58 | 301 | 2949 |
| Accuracy rate | 34.39% | 41.22% | 41.67% | 52.48% | 89.72% | 55.42% | 23.10% | 67.74% | 60.85% | 23.19% | 82.91% | 40.14% | 66.92% |

FIG. 9

INFORMATION PUSHING METHOD AND APPARATUS

PRIORITY CLAIM AND RELATED APPLICATION

This application is a continuation-in-part application of PCT/CN2016/111733, entitled "INFORMATION PUSHING METHOD AND APPARATUS" filed on Dec. 23, 2016, which claims priority to Chinese Patent Application No. 201610038929.2, filed with the State Intellectual Property Office of the People's Republic of China on Jan. 21, 2016, and entitled "INFORMATION PUSHING METHOD AND APPARATUS", both of which are incorporated herein by reference in their entirety.

FIELD OF THE TECHNOLOGY

The present disclosure relates to the field of wireless network technologies, and specifically to a method and system for analyzing network identifiers to derive characteristic properties of network providers and adjusting information pushing according to the derived characteristic properties of the network providers.

BACKGROUND OF THE DISCLOSURE

Wireless Fidelity (Wi-Fi) is a technology used to connect terminals, such as a personal computer, a handheld device (for example, a pad or a mobile phone), to each other in a wireless manner. In fact, Wi-Fi is a high-frequency radio signal, and the Wi-Fi belongs to a wireless network. All wireless networks have service set identifier (SSIDs) that are used to identify different wireless networks. By using the SSID technology, a wireless local area network may be divided into several wireless networks needing different identity verification. Each wireless network needs independent identity verification, and only a user whose identity verification succeeds may access a corresponding wireless network, so as to prevent unauthorized user from accessing the network. When needing to access a wireless network by using a terminal, a user first needs to find the wireless network according to an SSID of the wireless network, and then performs identity verification, to access the wireless network.

SUMMARY

Wireless networks are widely available to the public at business establishments, government offices, and public facilities. Many businesses and establishments provide wireless services without charge to people that visit them on location. Conventionally, the characteristics of the wireless networks are not known to information providers (e.g., content publishers, advertisers, event promoters, public service announcers, etc.), nor are the characteristics used to select targeted information for the users that are connected to the different wireless networks. Conventionally, any targeting of information require that the user provide consent for the collection of personal information and require user submission of certain information regarding the user's location and network if that information is not automatically included in the network traffic already. The users are often not informed enough or do not have the time and patience to tailor the disclosure of personal information and/or network information to their desire for targeted information being pushed to their devices. Furthermore, although some network information is automatically delivered via network communication (e.g., during handshake, and network connection establishment processes), there is currently no processing of that information to derive any characteristics that may be attributed to the users of the networks. There are also no known methods that effectively derive usable information related to the users of the networks and their interests from the network information. For at least these reasons, the present method and systems utilizes network information related to wireless networks, specifically, network identifying information of the wireless networks, to determine key characteristics that may, either alone or in combination, be relevant to the users of the networks, and select the appropriate information to deliver to the users of the network. By doing so, the efficiency of information delivery is improved, and wasteful network traffic is reduced which further reduces waste of computing resources and network resources. In addition, the characteristics of networks that relate to the efficient delivery of information are also derived through various learning methods, and the information delivery is tailored to the characteristics of the networks at different time and conditions, such that network congestions are reduced, and user experience is improved.

Embodiments of the present technology provide an information pushing method and apparatus, and a target attribute of a provider providing a target wireless network may be accurately determined, so as to push, in a targeted manner, target information associated with the target attribute to a target terminal. The pushed information is very accurate and practical.

A first aspect of the present technology provides an information pushing method, including:
obtaining at least two target base attributes of a target wireless network to which a target terminal is connected;
determining, according to a preset condition-based classification processing procedure, a target condition combination satisfied by the at least two target base attributes;
obtaining a network provider attribute corresponding to the target condition combination, and determining the network provider attribute corresponding to the target condition combination as a target attribute of a provider providing the target wireless network; and
pushing target information associated with the target attribute to the target terminal.

The embodiments of the present technology have the following beneficial effects:
In the embodiments of the present technology, at least two target attributes of a target wireless network to which a target terminal is connected is obtained, a target condition combination satisfied by the at least two target base attributes is determined according to a preset condition-based classification processing procedure, a network provider attribute corresponding to the target condition combination is obtained, the network provider attribute corresponding to the target condition combination is determined as a target attribute of a provider providing the target wireless network, and target information associated with the target attribute is pushed to the target terminal. In this way, the target attribute of the provider providing the target wireless network may be determined by using the preset condition-based classification processing procedure, so as to specifically push the target information associated with the target attribute to the target terminal. The pushed information is very specific and accurate, and can match user demands.

BRIEF DESCRIPTION OF THE DRAWINGS

To describe the technical solutions in the embodiments of the present technology or in the existing technology more clearly, the following briefly describes the accompanying drawings required for describing the embodiments or the existing technology. Apparently, the accompanying drawings in the following description show merely some embodiments of the present technology, and a person of ordinary skill in the art may still derive other drawings from these accompanying drawings without creative efforts.

FIG. 4 is a schematic diagram of word segmentation of an SSID according to some embodiments of the present technology;

FIG. 5 is a schematic diagram of word segmentation of SSIDs in a sample corpus according to some embodiments of the present technology;

FIG. 6 is a diagram of a solution for identifying a target attribute according to some embodiments of the present technology;

FIG. 7 is a training diagram of a target attribute of a wireless network according to some embodiments of the present technology;

FIG. 9 is an example of an identification result according to some embodiments of the present technology;

DESCRIPTION OF EMBODIMENTS

The following clearly and completely describes the technical solutions in the embodiments of the present technology with reference to the accompanying drawings in the embodiments of the present technology. Apparently, the described embodiments are merely some but not all of the embodiments of the present technology. All other embodiments obtained by a person of ordinary skill in the art based on the embodiments of the present technology without creative efforts shall fall within the protection scope of the present technology.

An information pushing method provided in the embodiments of the present technology is described in detail below with reference to FIG. 1 to FIG. 9.

Figure 1:
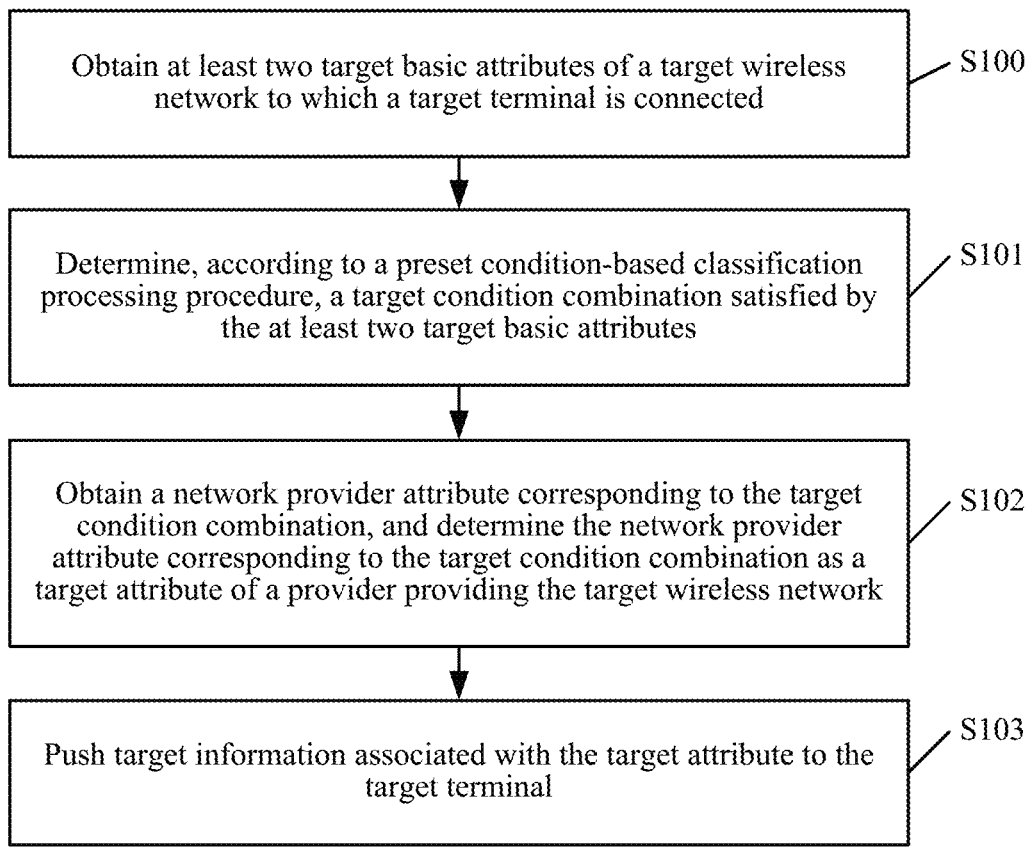
FIG. 1 is a flowchart of an information pushing method according to some embodiments of the present technology.

Referring to FIG. 1, FIG. 1 is a flowchart of an information pushing method according to an embodiment of the present technology. The method may include the following steps S100 to step S103. The method is optionally performed by a server of information, such as a server of media content, advertisement, public announcements, subscriptions, alerts, etc.

S100: Obtain at least two target base attributes of a target wireless network (e.g., a respective WiFi network provided at a respective location by a network provider such as an office, a business, a building management entity, etc.) to which a target terminal (e.g., a user device such as a smartphone, a tablet, a Personal Digital Assistant (PDA), etc.) is connected.

In a specific embodiment, an SSID and a BSSID of a wireless network may be used as a unique identifier for identifying a wireless network. The BSSID is a special application of an Ad-hoc LAN, which is also referred to as a base service set (BSS). In fact, the BSSID is a MAC address of an AP. A group of computers is provided with a same BSS name, that is, may form a group, and each BSS has a BSSID. The BSSID is a binary identifier with the length of 48 bits, and is used to identify different BSSs. A main advantage of the BSSID is that the BSSID may be used for filtration.

The target base attributes of the target wireless network may include, but is not limited to, an encryption type of the target wireless network, a user change rate of the target wireless network, quantities of people connecting to the target wireless network in different time segments, a device manufacturer of the target wireless network, and the like. As shown in FIG. 7, FIG. 7 shows some optional base attributes of a wireless network provided in this embodiment of the present technology. In a specific embodiment, different variables may be used to represent base attributes of a wireless network. For example, safe_type is used to represent the encryption type of the wireless network, and vendor is used to represent a manufacturer of the wireless network. Historic maximum number of connected equipment indicates the scale of the network provider, and the number of users that may concurrently share the network server of the network. This number provides a baseline for determining whether the network is congested or relatively uncongested for a target terminal connected to the network. The server based on the level of congestion, determines the type of media or the format of the information that is delivered to the terminal connected to the network. For example, if the current number of connected equipment is large, a more simplified version of the information is delivered, or vice versa. In some embodiments, the depending on the historic maximum number of connected equipment, the information server calculates the latency that may be experienced by the terminals connected to the network, and reschedule the response cycle of the information server for the terminals connected to this network (e.g., if the latency is large, the information server waits for a longer timeout before resending an unacknowledged information item). Historic count of administrative users is a cumulated count of administrative users on this network, and is an indication of the size of the network. The size of the network is optionally used by the server as an indication of security of the network. The security of the network increases with increasing number of administrative users below a threshold count, and decreases with further increase of the number of administrative users once above that threshold count. The server uses different level of security measure when communicating with the terminals on this network depending on the security level determined based on this count, in some embodiments. The "connection days" (e.g., the number of days that the network has been active), the "quantity of users powering off machines in last 21 days" (e.g., the number of users that have been continuously connected to the network during the last 21 days), are both indicative of the network's stability and security (e.g., connection days, and number of users powering off in the last 21 days), and the server adjusts the security level used when communicating with the terminals connected to these networks based on these values. Level-1 and level-2 classifications of geographic locations are locations on the province level and city level, or on the first-tier-city level, or second-tier-level, etc. The information user optionally uses this information to determine the expense level and cost of living data of the users of the networks and adjusts the type of products and discount information pushed to these networks. "User change rate" is the rate that the terminals connected to the network changes. This is used by the information server to determine the security of the network, and changes the security level when communicating with the terminals connected to the network. The "quantity of users from x o'clock toy o'clock" are used to determine the characteristics of the networks, for example, the hours of operation of the office/business/establishments that are providing the network, and the nature of the users using the network (e.g., employees, visitors, customers, etc.), the information server uses this information to determine the type of information to send to the users currently connected to the network. FIG. 7 lists the commercial attributes that are determined through the word segmentation of the SSIDs of various networks, and these commercial attributes are used as the base attributes of a target network of unknown attributes, based on the SSID segmentation of the target network, in some embodiments.

S101: Determine, according to a preset condition-based classification processing procedure, a target condition combination satisfied by the at least two target base attributes.

In a specific embodiment, when the base attributes of the wireless network satisfy different conditions, multiple condition combinations may be formed. That is, the preset condition-based classification processing procedure means that, when the base attributes of the wireless network satisfy different conditions, multiple condition combinations are built, and network provider attributes corresponding to the condition combinations are determined. The preset condition-based classification processing procedure in this embodiment of the present technology includes, but is not limited to, a decision tree algorithm. Specifically, a manner in which the multiple condition combinations are formed by using the base attributes of the wireless network may be that, for example, the base attributes include whether the wireless network is encrypted and whether multiple people connect to the wireless network in working hours, that is, four condition combinations may be formed. A first condition combination is that the wireless network is not encrypted and multiple people connect to the wireless network in the working hours; a second condition combination is that the wireless network is not encrypted and few people connect to the wireless network in the working hours; a third condition combination is that the wireless network is encrypted and multiple people connect to the wireless network in the working hours; and a fourth condition is that the wireless network is encrypted and few people connect to the wireless network in the working hours. Other combinations of conditions are derived from different combinations of values from the attributes listed in FIG. 7, for example. The combination of conditions may include combination of particular values for two or more of the attributes shown in FIG. 7, for example.

In this embodiment of the present technology, after the at least two target base attributes of the target wireless network to which the target terminal is connected are obtained, the target condition combination satisfied by the at least two target base attributes may be determined according to the preset condition-based classification processing procedure. The decision tree algorithm is used as an example for description. That is, a condition branch combination that is in the decision tree and that is satisfied by the at least two target base attributes is judged layer by layer in the decision tree. For example, two target base attributes of the target wireless network respectively are that the wireless network is encrypted and multiple people connect to the wireless network in the working hours, and the target condition combination satisfied by the two target base attributes is the third condition combination.

S102: Obtain a network provider attribute corresponding to the target condition combination, and determine the network provider attribute corresponding to the target condition combination as a target attribute of a provider providing the target wireless network.

In a specific embodiment, the network provider attribute corresponding to the target condition combination is obtained. The network provider attribute includes nature of the network provider, industry of the network provider, but is not limited to, organization, cultural education, hotel, company, entertainment, public facilities, transportation hub, and the like. In the preset condition-based classification processing procedure, network provider attributes are set for various condition combinations. The preset condition-based classification processing procedure is summarized based on probabilities of corresponding network provider attributes when base attributes of multiple sample networks satisfy different condition combinations.

The network provider attribute that is in the preset condition-based classification processing procedure and that corresponds to the target condition combination is determined as the target attribute of the provider providing the target wireless network. The target attribute of the provider providing the target wireless network may be commercial company, or may be entertainment, or the like.

S103: Push target information associated with the target attribute to the target terminal.

In a specific embodiment, when a user uses the target terminal to connect to the target wireless network having the target attribute, it indicates that the user pays more attention to information associated with the target attribute. For example, if the target attribute of the target wireless network connected by the user is hotel, it indicates that the user currently uses a wireless network of a hotel, and pays more attention to information about discounts provided by hotels. For another example, if the target attribute of the target wireless network connected by the user is cultural education, it indicates that the user currently uses a wireless network of an education school, and pays more attention to information about education culture.

After the target attribute of the target wireless network is determined, the target information associated with the target attribute may be pushed to the target terminal, to satisfy user demands.

In the embodiments of the present technology, at least two target attributes of a target wireless network to which a target terminal is connected is obtained, a target condition combination satisfied by the at least two target base attributes is determined according to a preset condition-based classification processing procedure, a network provider attribute corresponding to the target condition combination is obtained, the network provider attribute corresponding to the target condition combination is determined as a target attribute of a provider providing the target wireless network, and target information associated with the target attribute is pushed to the target terminal. In this way, the target attribute of the provider providing the target wireless network may be determined by using the preset condition-based classification processing procedure, so as to specifically push the target information associated with the target attribute to the target terminal. The pushed information is very specific and accurate, and can match user demands.

Figure 2:
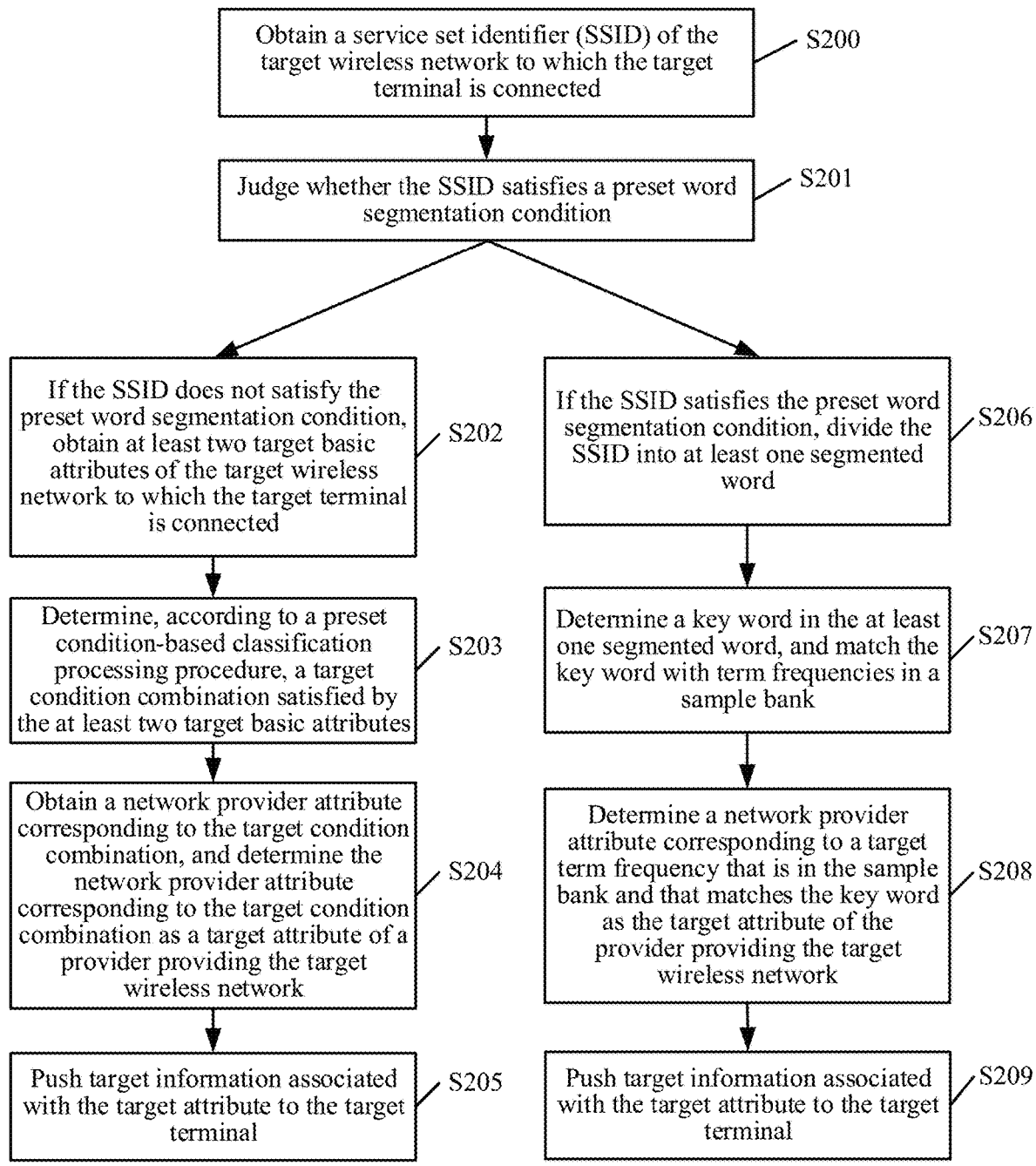
FIG. 2 is a flowchart of an information pushing method according to some embodiments of the present technology.

Referring to FIG. 2, FIG. 2 is a schematic flowchart of an information pushing method according to an embodiment of the present technology. As shown in the figure, the method may include the following steps S200 to step S209.

S200: Obtain an SSID of the target wireless network to which the target terminal is connected.

In a specific embodiment, an SSID of a wireless network may usually represent an attribute of a provider providing the wireless network. For example, if an SSID of a wireless network is "TANGLA Hotel", it may indicate that the network provider attribute is hotel. Therefore, in this embodiment, the SSID may be directly used to judge a target attribute of a provider providing the target wireless network. The SSID of the target wireless network to which the target terminal is connected is obtained. A privacy wireless network's SSID is often left as the default manufacture ID, or an ID that includes a person's last name, first name, or include the words, such home, house, etc. A private business's network's SSID often includes words such as a person's name and the nature of the business, such as "MAC's cafe", "Pete's coffee and donets", etc.

S201: Judge whether the SSID satisfies a preset word segmentation condition.

In a specific embodiment, whether the SSID satisfies the preset word segmentation condition is judged. The preset word segmentation condition may include, but is not limited to, whether the SSID is an unidentifiable English work or a signal word, and the like. Some SSIDs include only several simple English letters, for example, "abc", and such SSID cannot satisfy the preset word segmentation condition. Alternatively, an SSID includes a word and a letter, for example, "Wen abc", and such SSID also cannot satisfy the preset word segmentation condition, and cannot be identified by means of word segmentation. In some embodiments, the SSIDs that are categorized as unsegment able are treated as private or personal networks, and information pushing is targeted toward private persons as opposed to public networks, e.g., browsing history is treated as being attributed to a single person, as opposed to a blend of many users of the same network, and thus given more weight in determining the user's personal interests.

S202: If the SSID does not satisfy the preset word segmentation condition, obtain at least two target base attributes of the target wireless network to which the target terminal is connected.

In a specific embodiment, if the SSID does not satisfy the preset word segmentation condition, that is, the target attribute cannot be determined by means of word segmentation, the at least two target base attributes of the target wireless network to which the target terminal is connected may be obtained, and the at least two target base attributes are analyzed by using a preset condition-based classification processing procedure, to determine the target attribute of the provider providing the target wireless network.

S203: Determine, according to a preset condition-based classification processing procedure, a target condition combination satisfied by the at least two target base attributes.

S204: Obtain a network provider attribute corresponding to the target condition combination, and determine the network provider attribute corresponding to the target condition combination as a target attribute of a provider providing the target wireless network.

S205: Push target information associated with the target attribute to the target terminal.

Refer to steps S101 to S103 in the embodiment of FIG. 1 for steps S203 to S205 in this embodiment of the present technology. Details are not described herein again.

S206: When the SSID satisfies the preset word segmentation condition, divide the SSID into at least one segmented word.

In a specific embodiment, if the SSID satisfies the preset word segmentation condition, that is, the target attribute of the provider providing the target wireless network may be determined by performing word segmentation on the SSID, the SSID is divided into at least one segmented word, and the SSID may be specifically divided according to properties of words in the SSID and a word formation. As shown in FIG. 4, FIG. 4 gives an example of word segmentation provide in this embodiment of the present technology. In this embodiment, a unique wireless network may be determined according to an SSID and BSSID. As shown in the figure, if the SSID of the target wireless network is "TANGLA Hotel", a result of word segmentation of the SSID is "TANGLA" and "Hotel".

S207: Determine a key word in the at least one segmented word, and match the key word with term frequencies in a sample corpus, where the sample corpus includes correspondences between multiple term frequencies and multiple network provider attributes.

In a specific embodiment, the key word in the at least one segmented word is determined. The key word may usually represent an attribute of the provider providing the target wireless network corresponding to the SSID. The key word is usually a last segmented word in the result of word segmentation of the SSID. As shown in FIG. 4, if the result of word segmentation of the SSID is "TANG" and "Hotel", "Hotel" is the key word in the at least one segmented word.

The key word is matched with the term frequencies in the sample corpus. The sample corpus includes correspondences between multiple terms frequencies and multiple network provider attributes. It should be noted that, the sample corpus may be initially formed by means of manual operation, and may be subsequently updated by using a network provider attributes determined according to a base attribute of a unknown wireless network. As shown in FIG. 5, FIG. 5 is a schematic diagram of a sample corpus provided in this embodiment of the present technology. As shown in the figure, the sample corpus includes correspondences between various terms frequencies and network provider attributes. It should be noted that, the network provider attributes may have two-level classifications. For example, cultural education is level-1 classification, and education school is level-2 classification under cultural education. Term frequency column in FIG. 5 lists the rankings of the key words based on term frequency associated with the respective key words included in the corpus.

S208: Determine a network provider attribute corresponding to a target term frequency that is in the sample corpus and that matches the key word as the target attribute of the provider providing the target wireless network.

In a specific embodiment, the network provider attribute corresponding to the target term frequency that is in the sample corpus and that matches the key word is determined as the target attribute of the provider providing the target wireless network. For example, if the result of word segmentation of the SSID is "TANGLA" and "Hotel", "Hotel" is the key word in the at least one segmented word. The key word matches the fifth target term frequency in the sample corpus in FIG. 5, so that hotel is determined as the target attribute of the provider providing the target wireless network.

S209: Push target information associated with the target attribute to the target terminal.

Refer to step S103 in the embodiment of FIG. 1 for step S209 in this embodiment of the present technology. Details are not described herein again.

In the embodiments of the present technology, at least two target attributes of a target wireless network to which a target terminal is connected is obtained, a target condition combination satisfied by the at least two target base attributes is determined according to a preset condition-based classification processing procedure, a network provider attribute corresponding to the target condition combination is obtained, the network provider attribute corresponding to the target condition combination is determined as a target attribute of a provider providing the target wireless network, and target information associated with the target attribute is pushed to the target terminal. In this way, the target attribute of the provider providing the target wireless network may be determined by using the preset condition-based classification processing procedure, so as to specifically push the target information associated with the target attribute to the target terminal. The pushed information is very specific and accurate, and can match user demands.

Figure 3:
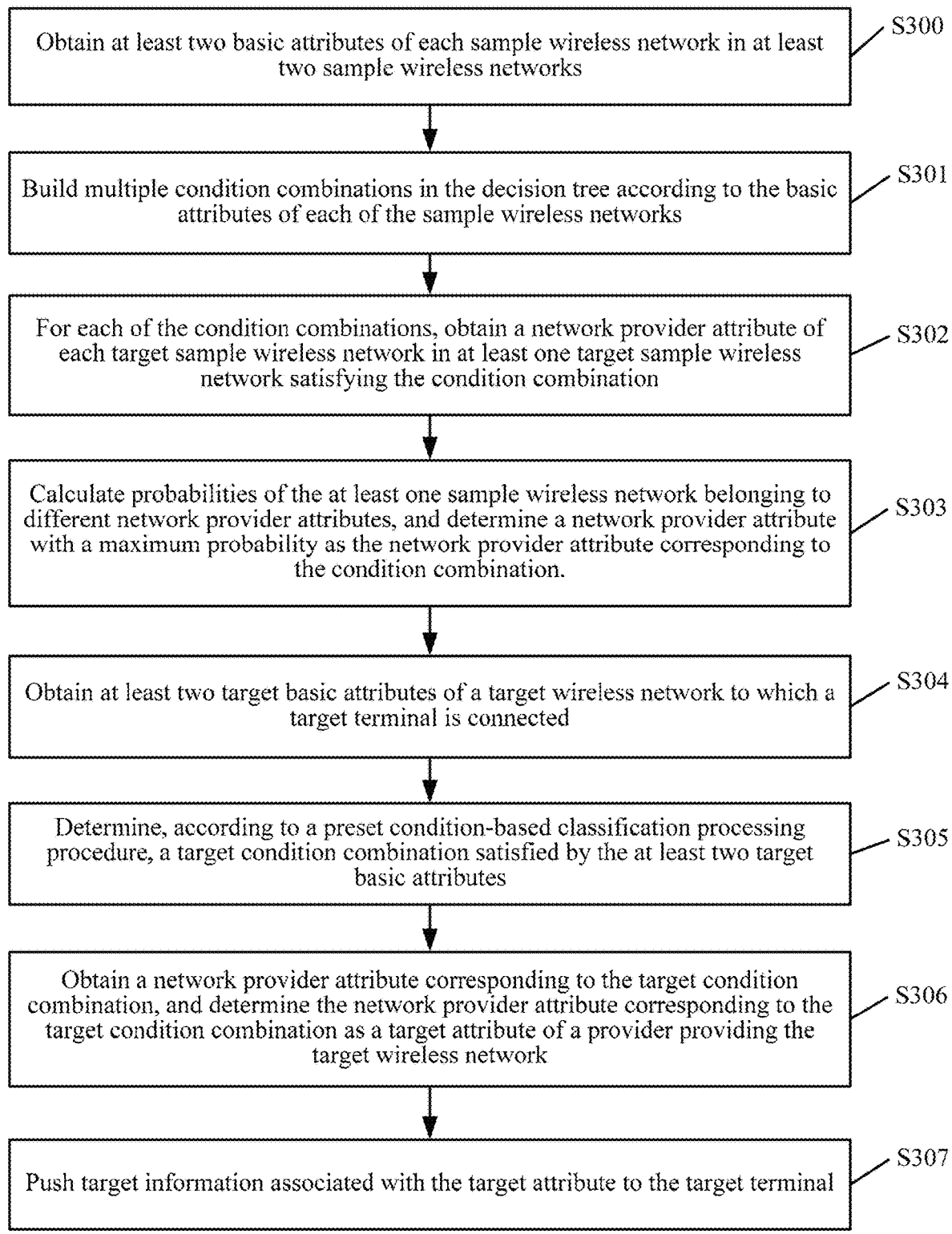
FIG. 3 is a flowchart of an information pushing method according to some embodiments of the present technology.

Referring to FIG. 3, FIG. 3 is a schematic flowchart of still another information pushing method according to an embodiment of the present technology. As shown in the figure, the method may include the following steps S300 to step S307.

S300: Obtain at least two base attributes of each sample wireless network in at least two sample wireless networks.

In a specific embodiment, a preset condition-based classification processing procedure may be a decision tree algorithm. The decision tree algorithm is used as an example for description herein, and the decision tree needs to be built in advance. Specifically, at least two base attributes of each sample wireless network in at least two sample wireless networks are obtained. The at least two base attributes may include several of multiple base attributes shown in FIG. 7.

S301: Build multiple condition combinations in the decision tree according to the base attributes of each of the sample wireless networks.

In a specific embodiment, multiple condition combinations in a decision tree are built according to base attributes of each sample wireless network. It should be noted that, in a process of building the decision tree, the distinction degree of a base attribute of an upper hierarchy in the decision tree is greater than that of a next hierarchy. As shown in the decision tree in FIG. 8, the distinction degree of a base attribute 1 is greater than that of a base attribute 2, a base attribute 3, a base attribute 4, and a base attribute 5. In this embodiment, the distinction degree of a base attribute is a ratio of quantities of sample wireless networks whose base attribute satisfies different conditions. For example, the base attribute 1 and the base attribute 2 are used for description. The base attribute 1 is whether a wireless network is encrypted. If a quantity of sample wireless networks that are not encrypted is 700, and a quantity of sample wireless networks that are encrypted is 300, the distinction degree is 700/300. The base attribute 2 is a quantity of wireless networks connected by more people in working hours. If a quantity of sample wireless networks connected by more people in working hours is 400, and a quantity of sample wireless networks connected by more people in non-working hours is 600, the distinction degree is 600/400. It is learned from the above description that, the distinction degree of the base attribute 1 is greater than that of the base attribute 2, and the base attribute 1 is used as an upper hierarchy of the decision tree. The decision tree is built in descending order according to distinction degrees of all base attributes of the sample wireless networks. Each hierarchy of the decision tree includes at least one base attribute. When the base attribute satisfies different conditions, different branches of the decision tree may be formed. When matching a condition, the server moves from the less distinct level to the more distinct level, in accordance with some embodiments. This process helps to provide more chances of finding a matched condition. When matching a condition, the server moves from the more distinct level to the less distinct level, in accordance with some embodiments. This process helps to reduce the amount of time to find the closest matching condition.

S302: For each of the condition combinations, obtain a network provider attribute of each target sample wireless network in at least one target sample wireless network satisfying the condition combination.

In a specific embodiment, for each condition combination, a network provider attribute of each target sample wireless network in at least one target sample wireless network satisfying the condition combination is obtained. As shown in a decision tree model in FIG. 8, a condition combination of a condition A, a condition D, and a condition E is used as an example, there may be multiple target sample wireless networks satisfying the condition combination, and a network provider attribute of each target sample wireless network needs to be obtained.

Optionally, the obtaining a network provider attribute of each target sample wireless network in at least one target sample wireless network satisfying the condition combination includes:

performing word segmentation on an SSID of each target sample wireless network in the at least one target sample wireless network, and determining the network provider attribute of each of the at least one target sample wireless network according to a result of the word segmentation.

In a specific embodiment, when the network provider attribute of each target sample wireless network is obtained, the network provider attribute may be determined by performing word segmentation on each sample wireless network. Refer to the descriptions of S206 to S208 for a specific word segmentation and determining method, and details are not described herein again.

S303: Calculate probabilities of the at least one sample wireless network belonging to different network provider attributes, and determine a network provider attribute with a maximum probability as the network provider attribute corresponding to the condition combination.

Figure 8:
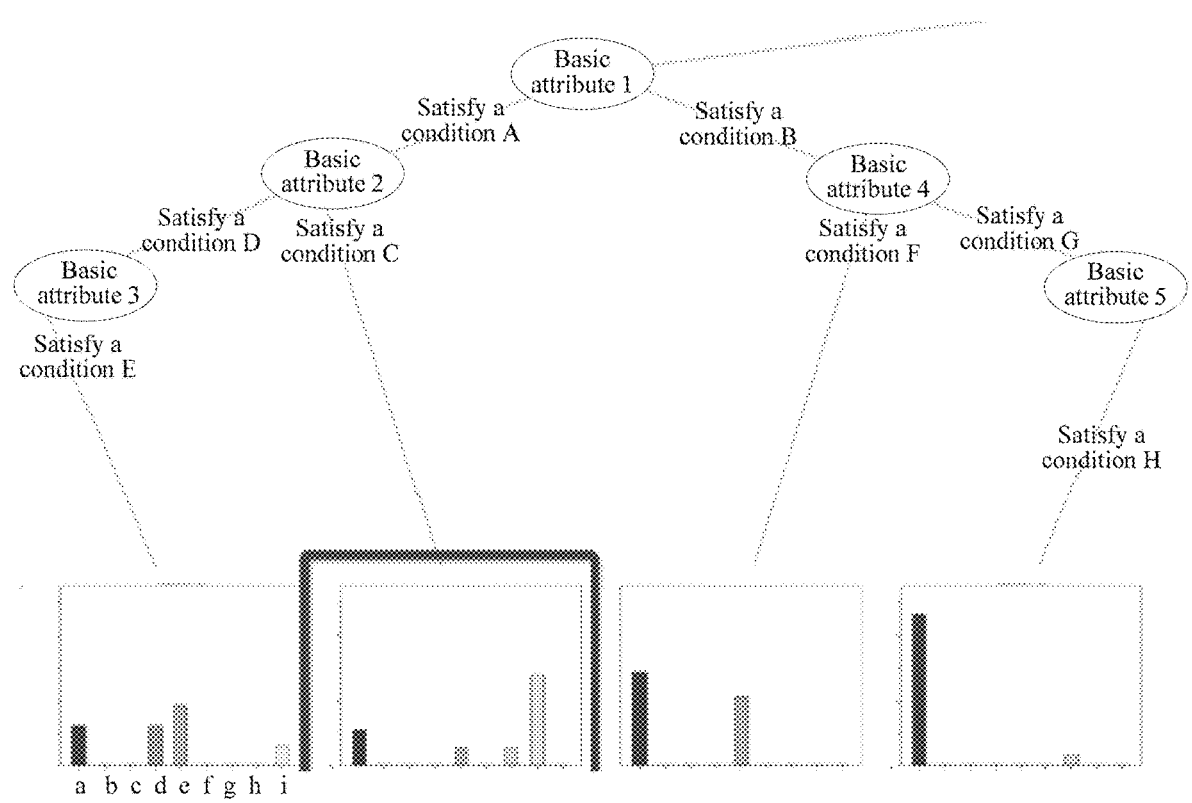
FIG. 8 is a schematic structural diagram of a decision tree according to some embodiments of the present technology.

In a specific embodiment, probabilities of multiple target sample wireless networks satisfying a condition combination and belong to different network provider attributes are calculated, and a network provider attribute with a maximum probability is determined as the network provider attribute corresponding to the condition combination. As shown in FIG. 8, among sample wireless networks satisfying a condition combination of A, D, and E, a network provider attribute e has a maximum probability (for example, X), and the network provider attribute corresponding to the condition combination is determined as e. It should be noted that, the network provider attribute e corresponding to the condition combination takes a form of a probability, that is, the probability of the network provider attribute e corresponding to the condition combination is X. A corresponding network provider attribute satisfying another condition combination is determined in a manner similar to that of the condition combination. It should be noted that, the more conditions that are matched by a target network, the higher fidelity is the prediction. For example, the prediction on the right side of FIG. 8 (e.g., one with high probability, and one with a small probability) for the attribute is much more likely to be accurate than the prediction on the left side of FIG. 8 (e.g., four predictions with similar probabilities).

S304: Obtain at least two target base attributes of a target wireless network to which a target terminal is connected.

S305: Determine, according to a preset condition-based classification processing procedure, a target condition combination satisfied by the at least two target base attributes.

S306: Obtain a network provider attribute corresponding to the target condition combination, and determine the network provider attribute corresponding to the target condition combination as a target attribute of a provider providing the target wireless network.

S307: Push target information associated with the target attribute to the target terminal.

Refer to steps S100 to S103 in the embodiment of FIG. 1 for steps S304 to S307 in this embodiment of the present technology. Details are not described herein again.

It should be noted that, refer to the diagram of a solution in FIG. 6 for the entire processing of determining the target attribute of the target wireless network. Word segmentation is first performed on a training sample to determine the network provider attribute of each sample wireless network, and then model training is performed according to another base attribute of each sample wireless network to obtain a decision tree model. The decision tree includes the network provider attribute corresponding to each condition combination. For unknown classified Wi-Fi data, the decision tree model may be used for calculation, to determine the target attribute of the provider providing the wireless network.

As shown in FIG. 9, FIG. 9 is a diagram showing a result of determining a target attribute of an unknown network by using the foregoing method according to an embodiment of the present technology. The first column corresponds to a collection of networks that are in the catering industry and with the attribute "catering", and how they have been identified in accordance with the methods described herein (e.g., how many of them are identified as each of 13 industries and given a corresponding attribute (e.g., catering, public facilities, company, shopping mall, organization, transportation hub, hotel, tourism attraction, community and residence, life service, cultural education, entertainment, medical care)). As shown in the figure, for each attribute of the wireless network, an accuracy rate for identifying the target attribute exists. For example, for the first column, 1823 (627+18+10+24+37+94+11+15+242+131+8+522+84) networks that actually belong to the catering industry are evaluated, and 627 of them are predicted to be belonging to the catering industry using the method described herein, therefore, a prediction accuracy of 627/1823=34.39% is obtained. An average accuracy rate of the model is 56.98%. If random guess is adopted, an accuracy rate is 1/13=7.7%. It is learned from the foregoing description that the accuracy rate is increased by 49.28%=56.98%−7.7%.

In the embodiments of the present technology, at least two target attributes of a target wireless network to which a target terminal is connected is obtained, a target condition combination satisfied by the at least two target base attributes is determined according to a preset condition-based classification processing procedure, a network provider attribute corresponding to the target condition combination is obtained, the network provider attribute corresponding to the target condition combination is determined as a target attribute of a provider providing the target wireless network, and target information associated with the target attribute is pushed to the target terminal. In this way, the target attribute of the provider providing the target wireless network may be determined by using the preset condition-based classification processing procedure, so as to specifically push the target information associated with the target attribute to the target terminal. The pushed information is very specific and accurate, and can match user demands.

Figure 10:
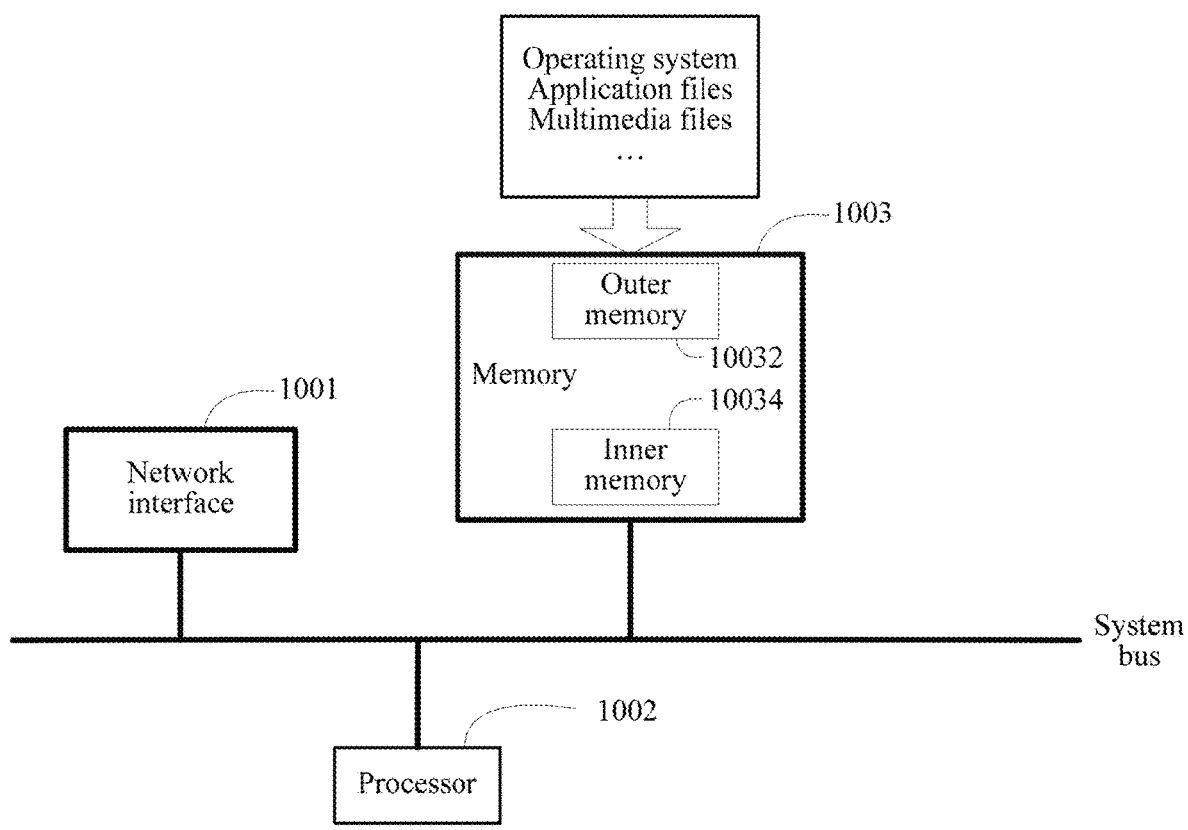
FIG. 10 is a schematic structural diagram of an information pushing apparatus according to some embodiments of the present technology.

FIG. 10 shows a server device of a computer system 10 based on the Von Neumann system for performing the information pushing method shown in FIG. 1 to FIG. 9. The computer system may be a server or server cluster directly performing the information pushing method, or a server cluster device providing a virtual machine as a server program operation environment to perform the information pushing method. Specifically, the computer system 10 may include a network interface 1001, a processor 1002, and a memory 1003 that are connected to each other by using a system bus. The memory 1003 may include an outer memory 10032 (for example, a hard disk, a compact disk, or a floppy disk) and an inner memory 10034.

In this embodiment, operation of the method is based on computer program. Program files of the computer is stored in the outer memory 10032 of the computer system 10 based on the Von Neumann system. When the program is operated, the program is loaded into the inner memory 10034, then is compiled into machine-language instructions, and the instructions are transferred to the processor 1002 to perform the instructions. In addition, in a process of performing the information pushing method, input parameters are received by using the network interface 1001, transferred to the memory 1003 for buffer, and then input to the processor 1002 for processing. Processed data may be buffered in the memory 1003 for subsequent processing, or be transferred to the network interface 1001 for output.

A group of program code is stored in the memory 1003, and the processor 1002 invokes the program code stored in the memory 1003 to perform the operations of the server described herein. A person of ordinary skill in the art may understand that the whole or parts of the process in the method of the embodiments may be completed by using computer program instruction related hardware. The programs may be stored in a computer readable storage medium. The programs corresponding to the modules of the information pushing apparatus shown in FIG. 10 may be stored in a readable storage medium of the information pushing apparatus, and be executed by at least one processor of the information pushing apparatus, to implement the information pushing method. The method includes the processes described in each method embodiment shown in FIG. 1 to FIG. 3. The storage medium may be: a magnetic disk, an optical disc, a read-only memory (ROM), a random access memory (RAM), or the like.

It should be appreciated that, each part of the present disclosure may be implemented by using hardware, software, firmware or a combination thereof. In the foregoing implementation manners, multiple steps or methods may be implemented by using the software or firmware that is stored in the memory and that is performed by an appropriate instruction execution system. For example, if it is implemented by hardware, it may be implemented by any one of the following technologies known in the art or a combination thereof as in another implementation manner: a discreet logic circuit having a logic gate circuit that is configured to implement logic functions of data signals, an application-specific integrated circuit having a suitable combined logic gate circuit, a programmable gate array (PGA), a field programmable gate array (FPGA), and the like.

What is disclosed above is merely examples of embodiments of the present technology, and certainly is not intended to limit the protection scope of the present technology. Therefore, equivalent variations made in accordance with the claims of the present technology shall fall within the scope of the present technology.

What is claimed is:

1. A method, comprising:
at a server having one or more processors and memory:
receiving, from a target terminal and via a target wireless network, a service set identifier (SSID) of the target wireless network to which the target terminal is currently connected;
obtaining at least two target base attributes of the target wireless network through parsing the SSID;
determining, according to a preset condition-based classification processing procedure, a target condition combination satisfied by the at least two target base attributes based on their corresponding distinction degrees, wherein the preset condition-based classification processing procedure comprises a decision tree algorithm, the decision tree algorithm comprising multiple base attributes and network provider attributes corresponding to different condition combinations satisfied by each base attribute in the multiple base attributes, wherein a distinction degree of a base attribute of an upper hierarchy in the decision tree is greater than that of a next hierarchy, and the distinction degree is a ratio of a first number of wireless networks whose base attribute satisfies a particular condition to a second number of wireless networks whose base attribute does not satisfy the particular condition;
obtaining a network provider attribute corresponding to the target condition combination;
determining a respective network provider attribute corresponding to the target condition combination as a target attribute of a provider providing the target wireless network; and
pushing, via the target wireless network, target information associated with the target attribute based on a location of the provider providing the target wireless network to the target terminal, wherein the target information comprises information different from network connection information, and includes one or more of media content, an advertisement, a public announcement, a subscription, or an alert.

2. The method according to claim 1, wherein:
the at least two target base attributes are selected from a set of base attribute comprising two or more of an encryption type of the wireless network, a user change rate of the wireless network, and a device manufacturer of the wireless network; and
the network provider attribute is selected from a set of network provider attribute comprising two or more of catering, company, education, shopping, hotel, life service, and entertainment.

3. The method according to claim 1, wherein the parsing of the SSID further comprises:
determining whether the SSID is an intelligible expression or not; and
obtaining, in accordance with a determination that the SSID is an intelligible expression, the at least two target base attributes of the target wireless network to which the target terminal is connected.

4. The method according to claim 3, further comprising:
dividing, in accordance with a determination that the SSID is not an intelligible expression, the SSID into at least one segmented word;
determining a key word in the at least one segmented word,
matching the key word with term frequencies in a sample corpus, wherein the sample corpus comprises correspondences between multiple term frequencies and multiple network provider attributes; and
determining a respective network provider attribute corresponding to a target term frequency that is in the sample corpus and that matches the key word as the target attribute of the provider providing the target wireless network.

5. The method according to claim 1, wherein before obtaining the at least two target base attributes of the target wireless network to which the target terminal is connected, the method further comprises:
obtaining at least two base attributes of each sample wireless network in at least two sample wireless networks;
building multiple condition combinations in the decision tree according to the base attributes of each of the sample wireless networks;
for each of the condition combinations:
obtaining respective network provider attributes of each target sample wireless network in at least one target sample wireless network satisfying the condition combination;
calculating probabilities of the network provider attributes in the at least one sample wireless network; and
using a respective network provider attribute with a maximum probability as the network provider attribute corresponding to the condition combination.

6. The method according to claim 5, wherein obtaining the respective network provider attributes of each target sample wireless network in the at least one target sample wireless network satisfying the condition combination comprises:
performing word segmentation on a respective SSID of each target sample wireless network in the at least one target sample wireless network, and determining the network provider attributes of each of the at least one target sample wireless network according to a result of the word segmentation.

7. The method according to claim 1, wherein:
one of the at least two target base attributes includes quantities of people connecting to the wireless network in different time segments is used to deduce whether the people using the wireless network are employees, visitors, or customers.

8. A server, comprising:
one or more processors; and
memory storing instructions, which when executed by the one or more processors, cause the processors to perform operations comprising:
receiving, from a target terminal and via a target wireless network, a service set identifier (SSID) of the target wireless network to which the target terminal is currently connected;
obtaining at least two target base attributes of the target wireless network through parsing the SSID;
determining, according to a preset condition-based classification processing procedure, a target condition combination satisfied by the at least two target base attributes based on their corresponding distinction degrees, wherein the preset condition-based classification processing procedure comprises a decision tree algorithm, the decision tree algorithm comprising multiple base attributes and network provider attributes corresponding to different condition combinations satisfied by each base attribute in the multiple base attributes, wherein a distinction degree of a base attribute of an upper hierarchy in the decision tree is greater than that of a next hierarchy, and the distinction degree is a ratio of a first number of wireless networks whose base attribute satisfies a particular condition to a second number of wireless networks whose base attribute does not satisfy the particular condition;

obtaining a network provider attribute corresponding to the target condition combination;

determining a respective network provider attribute corresponding to the target condition combination as a target attribute of a provider providing the target wireless network; and pushing, via the target wireless network, target information associated with the target attribute based on a location of the provider providing the target wireless network to the target terminal, wherein the target information comprises information different from network connection information, and includes one or more of media content, an advertisement, a public announcement, a subscription, or an alert, wherein the preset condition-based classification processing procedure comprises a decision tree algorithm, the decision tree algorithm comprising multiple base attributes and network provider attributes corresponding to different condition combinations satisfied by each base attribute in the multiple base attributes, wherein a distinction degree of a base attribute of an upper hierarchy in the decision tree is greater than that of a next hierarchy, and the distinct degree is a ratio of a first number of wireless networks whose base attribute satisfies a particular condition to a second number of wireless networks whose base attribute does not satisfy the particular condition.

9. The server according to claim 8, wherein:
the at least two target base attributes are selected from a set of base attribute comprising two or more of an encryption type of the wireless network, a user change rate of the wireless network, and a device manufacturer of the wireless network; and
the network provider attribute is selected from a set of network provider attribute comprising two or more of catering, company, education, shopping, hotel, life service, and entertainment.

10. The server according to claim 8, wherein the parsing of the SSID further comprises:
determining whether the SSID is an intelligible expression or not; and
obtaining, in accordance with a determination that the SSID is an intelligible expression, the at least two target base attributes of the target wireless network to which the target terminal is connected.

11. The server according to claim 10, wherein the operations further include:
dividing, in accordance with a determination that the SSID is not an intelligible expression, the SSID into at least one segmented word;
determining a key word in the at least one segmented word;
matching the key word with term frequencies in a sample corpus, wherein the sample corpus comprises correspondences between multiple term frequencies and multiple network provider attributes; and determining a respective network provider attribute corresponding to a target term frequency that is in the sample corpus and that matches the key word as the target attribute of the provider providing the target wireless network.

12. The server according to claim 8, wherein before obtaining the at least two target base attributes of the target wireless network to which the target terminal is connected, the method further comprises:
obtaining at least two base attributes of each sample wireless network in at least two sample wireless networks;
building multiple condition combinations in the decision tree according to the base attributes of each of the sample wireless networks;
for each of the condition combinations:
obtaining respective network provider attributes of each target sample wireless network in at least one target sample wireless network satisfying the condition combination;
calculating probabilities of the network provider attributes in the at least one sample wireless network; and
using a respective network provider attribute with a maximum probability as the network provider attribute corresponding to the condition combination.

13. The server according to claim 12, wherein obtaining the respective network provider attributes of each target sample wireless network in the at least one target sample wireless network satisfying the condition combination comprises:
performing word segmentation on a respective SSID of each target sample wireless network in the at least one target sample wireless network, and determining the network provider attributes of each of the at least one target sample wireless network according to a result of the word segmentation.

14. The server of claim 8, wherein:
one of the at least two target base attributes includes quantities of people connecting to the wireless network in different time segments is used to deduce whether the people using the wireless network are employees, visitors, or customers.

15. A non-transitory computer-readable storage medium storing instructions, which when executed by one or more processors, cause the processors to perform operations comprising:
receiving, from a target terminal and via a target wireless network, a service set identifier (SSID) of the target wireless network to which the target terminal is currently connected;
obtaining at least two target base attributes of the target wireless network through parsing the SSID;
determining, according to a preset condition-based classification processing procedure, a target condition combination satisfied by the at least two target base attributes based on their corresponding distinction degrees, wherein the preset condition-based classification processing procedure comprises a decision tree algorithm, the decision tree algorithm comprising multiple base attributes and network provider attributes corresponding to different condition combinations satisfied by each base attribute in the multiple base attributes, wherein a distinction degree of a base attribute of an upper hierarchy in the decision tree is greater than that of a next hierarchy, and the distinction degree is a ratio of a first number of wireless networks whose base attribute satisfies a particular condition to a second number of wireless networks whose base attribute does not satisfy the particular condition;

obtaining a network provider attribute corresponding to the target condition combination;

determining a respective network provider attribute corresponding to the target condition combination as a target attribute of a provider providing the target wireless network; and pushing, via the target wireless network, target information associated with the target attribute based on a location of the provider providing the target wireless network to the target terminal, wherein the target information comprises information different from network connection information, and includes one or more of media content, an advertisement, a public announcement, a subscription, or an alert.

16. The computer-readable storage medium according to claim 15, wherein:

the at least two target base attributes are selected from a set of base attribute comprising two or more of an encryption type of the wireless network, a user change rate of the wireless network, and a device manufacturer of the wireless network; and the network provider attribute is selected from a set of network provider attribute comprising two or more of catering, company, education, shopping, hotel, life service, and entertainment.

17. The computer-readable storage medium according to claim 15, wherein the parsing of the SSID further comprises:

determining whether the SSID is an intelligible expression or not; and obtaining, in accordance with a determination that the SSID is an intelligible expression, the at least two target base attributes of the target wireless network to which the target terminal is connected.

18. The computer-readable storage medium according to claim 17, wherein the operations further include:

dividing, in accordance with a determination that the SSID is not an intelligible expression, the SSID into at least one segmented word;

determining a key word in the at least one segmented word, matching the key word with term frequencies in a sample corpus, wherein the sample corpus comprises correspondences between multiple term frequencies and multiple network provider attributes; and determining a respective network provider attribute corresponding to a target term frequency that is in the sample corpus and that matches the key word as the target attribute of the provider providing the target wireless network.

19. The computer-readable storage medium according to claim 15, wherein before obtaining the at least two target base attributes of the target wireless network to which the target terminal is connected, the operations further comprises:

obtaining at least two base attributes of each sample wireless network in at least two sample wireless networks;

building multiple condition combinations in the decision tree according to the base attributes of each of the sample wireless networks;

for each of the condition combinations:

obtaining respective network provider attributes of each target sample wireless network in at least one target sample wireless network satisfying the condition combination;

calculating probabilities of the network provider attributes in the at least one sample wireless network; and using a respective network provider attribute with a maximum probability as the network provider attribute corresponding to the condition combination.

20. The computer-readable storage medium according to claim 15, wherein:

one of the at least two target base attributes includes quantities of people connecting to the wireless network in different time segments is used to deduce whether the people using the wireless network are employees, visitors, or customers.

* * * * *